C. B. HARROP.
METHOD AND APPARATUS FOR BURNING CLAY WARE.
APPLICATION FILED JUNE 13, 1919.

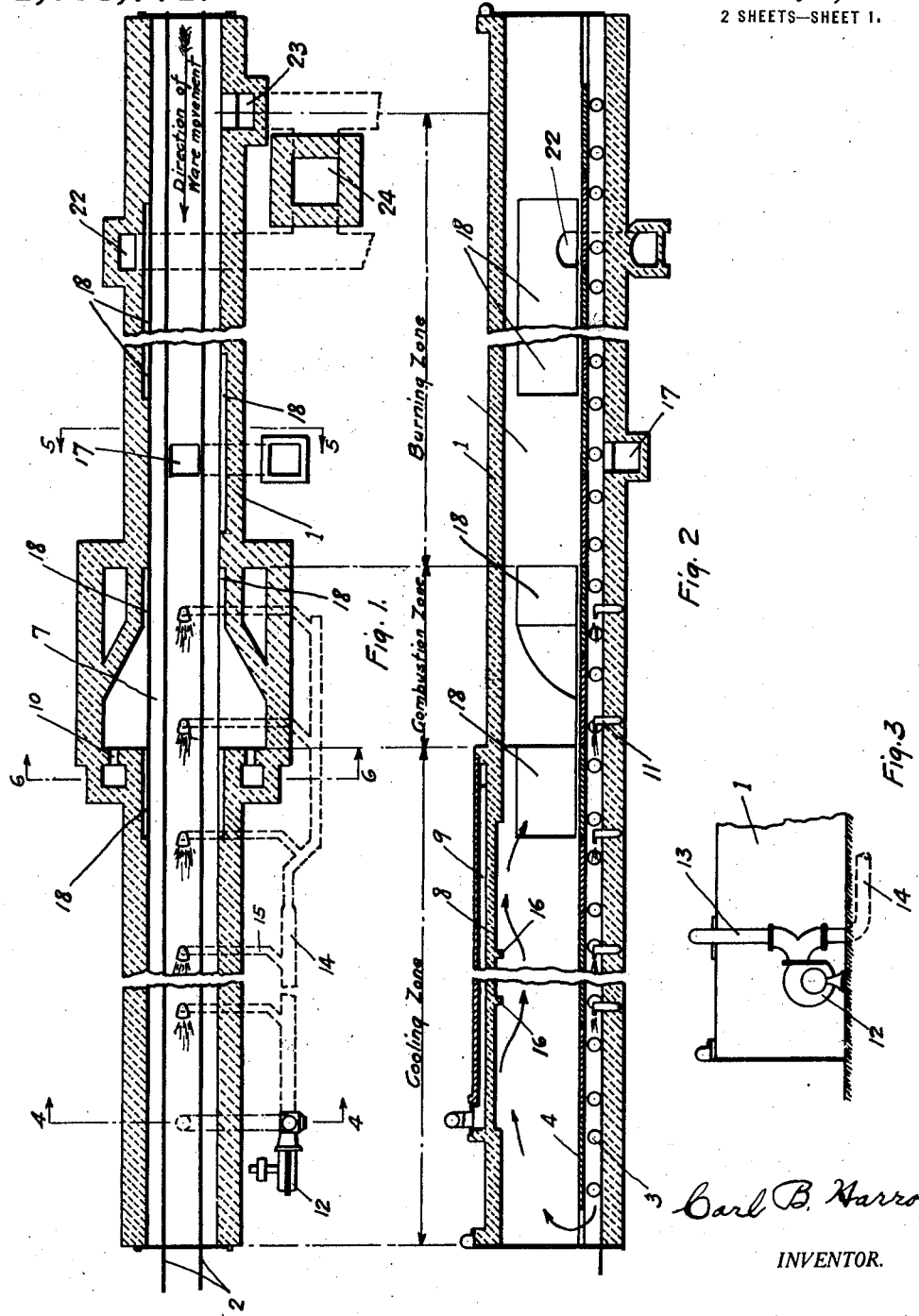

1,338,771.

Patented May 4, 1920.
2 SHEETS—SHEET 2.

Carl B. Harrop
INVENTOR.

BY Edwin P. Corkett
ATTORNEY.

UNITED STATES PATENT OFFICE.

CARL B. HARROP, OF COLUMBUS, OHIO.

METHOD AND APPARATUS FOR BURNING CLAY WARE.

1,338,771.　　　　　Specification of Letters Patent.　　　Patented May 4, 1920.

Application filed June 13, 1919. Serial No. 303,875.

*To all whom it may concern:*

Be it known that I, CARL B. HARROP, a citizen of the United States of America, residing at Columbus, in the county of Franklin and State of Ohio, have invented certain new and useful Improvements in Methods and Apparatus for Burning Clay Ware, of which the following is a specification.

My invention relates to method and apparatus for burning clay ware and aims to provide a novel method and kiln whereby it is possible to burn the ware to a more even temperature throughout the cross-section of the setting of the ware. It particularly pertains to tunnel kilns and involves the method of using the same as well as certain novel structural characteristics complemental to such use.

In kilns of this type, the secret of successful operation lies primarily in the manner of handling and applying the burning gases and the air introduced for cooling the ware and for supporting combustion. I have devised a novel method of doing this and have provided apparatus to facilitate the application of such methods with the result that the gases introduced both for burning and for cooling the ware are applied to the proper localities in the proper degree and at the proper temperature. My methods are particularly related to the kiln that I am about to describe but they also have to do with the placing of the setting of ware and even with the use of certain supplemental units that may be placed on such setting for coöperation with the setting and kiln structure to attain the desired results.

One of the objects of my invention is to provide a novel structure of kiln and to operate it in such a novel manner that the products of combustion in passing through the burning end of the kiln will be very largely diverted downwardly to and will largely travel through a zone extending throughout the length of the burning end of the kiln between the combustion zone and the draft outlets and located adjacent the lower portion of the setting of the ware. In order to accomplish this, I have provided a kiln whose walls are constructed with normal clearance spaces at their upper ends but with clearance spaces of gradually increasing width downwardly until they attain their maximum width and terminate adjacent and slightly above the platforms carrying the ware. Each wall of the kiln is provided with a plurality of these clearances in spaced relation but the clearances on the opposite wall are in staggered relation so that the combustion gases will normally tend to follow a tortuous path in an approximately horizontal plane. Furthermore, the setting of the ware is so arranged at its top as to fit the interior of the kiln with comparative closeness. This result may be attained by the utilization of segmental stop-blocks or drop arches in the kiln structure, the idea being to discourage the passage of the gases along the crown of the kiln with the result that they will seek the clearance spaces mentioned and particularly those portions of the clearances having the greatest gas-carrying capacities. Thus, the gases which would otherwise normally tend to rise to the top and pass along the crown of the kiln are largely diverted to the bottom of the setting and pass first from one side of the kiln to the other in the course of which they inevitably pass through the lower portion of the setting. It will be seen that by this operation one of the very common defects in kilns of this type is overcome, that is, the burning gases are largely applied at the bottom of the setting rather than almost entirely at the top which usually occurs in prior kilns of this type.

An additional feature of my invention has to do with the provision of a means for introducing the primary air to the point of combustion along the crown of the kiln and in such close relation thereto that this primary air will absorb the heat from the cooling ware and from the secondary air which is passed down into the ware at successive intervals but which in the interim between such intervals is permitted to rise into direct contact with the under side of the crown of the kiln and consequently into zones where such transfer of heat will be facilitated. Stated in another way, the cooling air is forced directly into contact with the ware and has a tendency to rise to the crown of the kiln which forms a bottom for the passage through which the primary air is carried to the point of combustion. The interior of this crown is provided with depending baffles at spaced intervals and the result is that the cooling air passes successively into contact with the crown and then when it strikes a baffle, down into the ware, and then back up to the crown, and so on. The result is a very efficient cooling of the ware and a very simple and effective heating of the primary air in the manner above described.

A still further feature of my invention has to do with a novel method of and apparatus for cooling the underneath portion of the carrying trucks or such other conveying units as may be provided. I accomplish this by sealing that portion of the kiln above the platforms of the conveying units away from that portion of the kiln beneath the platforms of the conveying units. Then I provide means for forcing air into the lower space described and along such lower space to the end of the kiln from which the ware is discharged. This cooling air then passes upwardly and then back through the kiln and setting of ware where it joins the primary air at the combustion zone. A novel aspect of the apparatus used here consists in the provision of a means in the form of a vent for permitting escape of the excess of air in the event that more air is necessary for cooling the lower portions of the conveying units than will be needed for cooling the ware and supporting combustion.

The preferred form of kiln for the practice of my improved method is shown in the accompanying drawings where similar characters of reference designate corresponding parts and wherein—

Figure 1 is a horizontal section of my novel form of kiln.

Fig. 2 is a vertical longitudinal section of my kiln.

Fig. 3 is a detail view showing the blower installation preferably utilized by me.

Figure 4:
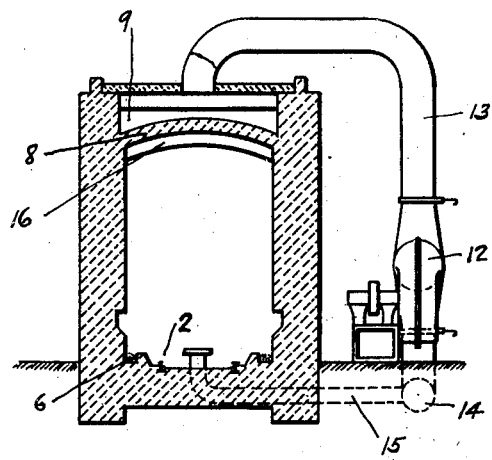
Fig. 4 is a vertical transverse section of my kiln taken on line 4—4 of Fig. 1, showing the manner of introducing the primary air and also the secondary air.

In the drawings, my kiln is shown at 1 and mounted in the base thereof are track rails 2 upon which are run cars having wheels 3 and platforms 4.

Figure 5:
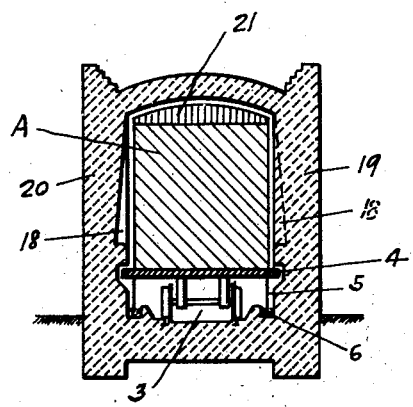
Fig. 5 is a section taken on line 5—5 of Fig. 1.
Figure 6:
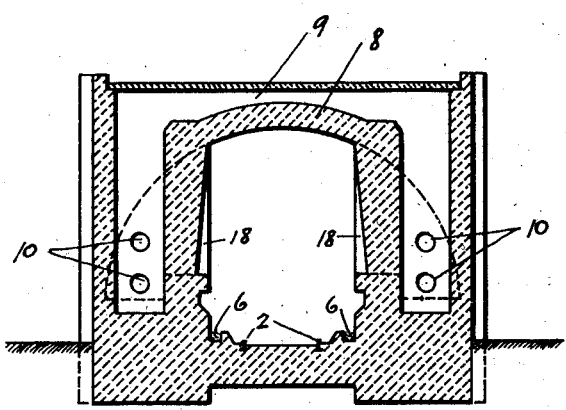
Fig. 6 is a section taken on line 6—6 of Fig. 1.

By reference to Fig. 5, it will appear that the car platforms are provided with depending aprons 5 which travel in sand-filled grooves 6, thus producing a sand seal. The structure of the platforms and of these depending aprons in conjunction with the sand grooves effectually seal that portion of the kiln beneath such platforms away from that portion of the kiln above such platforms, that is, throughout the continuous length of the moving platforms. It will be pointed out later that there is an escapement passage between the discharge end of the car or moving platform approaching the discharge end and the door which normally closes the discharge end of the kiln. The combustion zone or chamber of the kiln is shown at 7, being located intermediate the ends of the kiln. That portion of the crown of the kiln which is to the left of the combustion zone, as shown in Fig. 2 of the drawings, is of relatively thin material at 8 and this thin portion of the crown forms the bottom of a chamber 9 through which the primary air is to pass on its way to the combustion ports 10. In this same end of the kiln, and beneath the moving platform structure, I have provided a plurality of blast nozzles 11 through which the air is to be forced. The primary air which travels through the passage 9 and the air which travels to and through the nozzles 11 is forced to both these points by a blower-fan 12 having a branch-pipe 13 leading to the passage 9 and a branch-pipe 14 leading by way of a plurality of extensions 15 to the nozzles 11.

The cooling end of the kiln is further provided with a plurality of spaced baffles 16 depending from the interior of the crown of the kiln.

That portion of the kiln which lies to the right of the combustion zone as shown in Figs. 1 and 2 is provided with an outlet vent 17 which is designed to permit the escape of the excess air. The operation of this will be described later.

In this portion of the kiln to the right of the combustion zone, it will be seen by reference to Fig. 5 that the walls thereof are provided with downwardly and outwardly flaring clearance spaces, indentations or grooves designated 18. The clearance spaces in wall 19 are arranged at spaced intervals along the wall and in this sense are discontinuous. The same thing applies to the clearances in wall 20. However, these clearance spaces in both walls are so disposed that gases will readily travel along the clearance spaces in one wall and then pass to the next clearance space in the other wall providing the conditions of the setting of the ware are suitable. In other words, these clearances are arranged in staggered relation.

In Fig. 5, it will be noted that the setting of the ware A closely fits the walls of the kiln at their tops. This setting may likewise be built up to fit the crown of the kiln with comparative closeness; but in this showing, it will appear that there is mounted upon the top of the setting a segmental stop-block 21. I may find it desirable to provide a plurality of these stop-blocks or merely to rely upon the setting of the ware itself; or I may provide the crown of the kiln with depending baffles. In any event, the desired result is the practical closure of the upper portion of the tunnel space so that the combustion gases which would otherwise tend to hug the crown must seek the clearance spaces 18 and will, in fact, very largely seek the lower portions of such clearance spaces due to their greater capacities. The setting of the ware should be such that the tendency of the gases to pass along the kiln adjacent the crown will be practically overcome with the result that such gases will pass in a tortuous path from side to side of the kiln, that is, first to one clearance space and then across the kiln through the lower portion of the setting to other clearance spaces. It is desirable to build the lower portion of the setting of ware to further facilitate this passage of the gases therethrough.

In the operation of my method and apparatus, the ware is placed in the kiln upon the moving platforms and is either provided with the segmental stop-blocks at suitable intervals or is otherwise built to effect the result just described. Gas is carried to the combustion zone in the usual manner and air is forced into the passage 9 above the crown and through the nozzles 11 by means of the blower 12. The ware passes from right to left in Figs. 1 and 2 and the products of combustion pass from the combustion zone toward the right and along the kiln to the draft outlets 22 and 23 which lead to the stack 24. In so passing, since the gases are precluded from ready passage along the crown of the kiln, they will mainly pass from a clearance space in one wall through the setting of the ware to the adjacent clearance space in the opposite wall and so on, whereby the heat is concentrated near the lower portion of the setting as contradistinguished from other kilns. The ware passes gradually through the combustion zone traveling from right to left and enters the cooling zone which is to the left of the combustion zone. There it is struck by the cooling air which has been forced along beneath the moving platforms to the end of the kiln and then up above such platforms and back toward the combustion zone. This cooling air first tends to travel along the crown of the kiln but then strikes a baffle 16 and is temporarily deflected down into the ware where it absorbs more heat and then rises to the crown. When this air is in contact with the crown the heat from it is conducted through the thin wall 8 of the crown where it is absorbed by the primary air traveling through the passage 9. The result is successive removal of the heat from this secondary air by the primary air, then absorption of more heat from the ware by the secondary air and then again removal of the heat from the secondary air by absorption into the primary air. If it becomes necessary to put in more air for cooling the lower portions of the conveying units than is necessary for proper cooling of the ware and support of combustion, I have provided a vent 17 so that a certain amount of this air may escape if desired.

Having thus described my invention, what I claim is:

1. The method of burning ware which comprises passing it through a tunnel kiln having staggered clearance spaces formed in the walls of the kiln which gradually increase in capacity toward the bottom of the setting of the ware, and so building the setting of ware in its upper portion either alone or in conjunction with stop-block units that the gases will seek the lower parts of such clearance spaces as being the paths of least resistance, and will pass through the setting in so seeking.

2. The method of burning ware which comprises passing it through a tunnel kiln, providing relatively small clearance between the setting of ware and kiln at and adjacent the crown of the kiln, and providing a clearance between the kiln walls and the setting of the ware which gradually increases toward the bottom of the setting.

3. The method of burning ware in a tunnel kiln which comprises passing the ware through a kiln having staggered clearance spaces formed in its walls adjacent the bottom of the setting of the ware and so building the setting of the ware either alone or in conjunction with stop-block units that the gases will seek such clearance spaces as being the paths of least resistance and will pass through the lower portions of the setting in so doing.

4. The method of burning ware in a tunnel kiln which comprises sealing that portion of the kiln above the conveying units away from that portion of the kiln below the platforms of said conveying units, forcing cooling air into the lower portion mentioned, whence it passes to the end of the kiln where the ware is discharged, and then upwardly and back toward the combustion zone through that portion of the kiln above the platforms of the carrying units for cooling the setting of ware by direct contact therewith.

5. In combination, a tunnel kiln, and stop-blocks to be mounted on the ware and constructed to closely fit the crown of the kiln so as to prevent free sweep of gases above the top of the ware.

6. A tunnel kiln comprising means for practically blocking a through passage above the ware.

7. A tunnel kiln comprising a primary air passage in the top of the kiln and separated therefrom by the kiln crown, and baffles depending from said crown at spaced points for directing the secondary air downwardly through the ware at spaced intervals in its passage toward the combustion zone and alternately permitting it to rise against the crown and give heat to the primary air passing through said passage to the combustion zone.

8. A tunnel kiln comprising a primary air passage in the top of the kiln, and means for alternately directing the secondary air down through the ware and permitting it to rise against the crown which separates said passage from the interior of the kiln whereby the heat is successfully extracted from the ware and imparted to the primary air as both the primary and secondary air proceed toward the combustion zone.

9. A tunnel kiln designed to closely fit the setting of ware passing through the kiln at that portion adjacent the upper portion of the ware but widened at that portion adjacent the bottom of the setting of ware.

10. A tunnel kiln comprising side walls designed with indentations in staggered relation.

11. A tunnel kiln comprising side walls with downwardly and outwardly flaring spaces.

12. A tunnel kiln comprising side walls specially formed with relatively large clearances at intervals adjacent the bases of the setting of ware passing through.

13. A tunnel kiln comprising side walls specially formed with clearances in staggered relation adjacent the bases of the ware passing through.

14. A tunnel kiln designed to closely fit the setting of ware passing through at that portion adjacent the upper portion of the setting of ware but having staggered clearance spaces at that portion adjacent the base of the setting of the ware.

15. The method of burning ware in a tunnel kiln which comprises sealing that portion of the kiln above the conveying units away from that portion of the kiln below the platforms of the conveying units, forcing cooling air into the lower portion mentioned, whence it passes to the end of the kiln where the ware is discharged, and then upwardly and back toward the combustion zone through that portion of the kiln above the platforms of the conveying units for cooling the setting of ware by direct contact therewith, passing primary air for combustion through a passage in the kiln crown, and alternately permitting the said cooling air to rise against the crown and forcing it down into the ware.

16. A tunnel kiln which comprises means for sealing that portion of the kiln above the conveying units away from that portion of the kiln below the platforms of such units, means for forcing cooling air into the lower portion mentioned whence it passes to the end of the kiln and then upwardly and back toward the combustion zone, through that portion of the kiln above the platforms of the conveying units for cooling the setting of the ware by direct contact therewith, a passage in the crown through which primary air travels to the points of combustion, and means for alternately directing this cooling air down into the ware and then allowing it to rise against the crown.

In testimony whereof I hereby affix my signature.

CARL B. HARROP.